United States Patent
Thust

(10) Patent No.: US 9,767,072 B2
(45) Date of Patent: Sep. 19, 2017

(54) DETERMINATION OF THE TRANSFER FUNCTION OF A SIGNAL-PROCESSING SYSTEM WITHOUT A KNOWN INPUT SIGNAL

(75) Inventor: Andreas Thust, Cologne (DE)

(73) Assignee: Forschungszentrum Juelich GmbH (DE)

( * ) Notice: Subject to any disclaimer, the term of this patent is extended or adjusted under 35 U.S.C. 154(b) by 265 days.

(21) Appl. No.: 14/125,731

(22) PCT Filed: Apr. 21, 2012

(86) PCT No.: PCT/DE2012/000425
§ 371 (c)(1),
(2), (4) Date: Dec. 12, 2013

(87) PCT Pub. No.: WO2013/007226
PCT Pub. Date: Jan. 17, 2013

(65) Prior Publication Data
US 2014/0108476 A1 Apr. 17, 2014

(30) Foreign Application Priority Data
Jul. 14, 2011 (DE) .................. 10 2011 107 371

(51) Int. Cl.
*G06F 17/10* (2006.01)
*G06T 5/00* (2006.01)

(52) U.S. Cl.
CPC .............. *G06F 17/10* (2013.01); *G06T 5/003* (2013.01); *G06T 2207/20048* (2013.01)

(58) Field of Classification Search
CPC ....................................................... G06F 17/10
See application file for complete search history.

(56) References Cited

U.S. PATENT DOCUMENTS 3,973,112 A * 8/1976 Sloane .................. G01M 7/022
324/76.21
5,315,532 A * 5/1994 Comon .................. G01S 3/043
702/196
(Continued)

FOREIGN PATENT DOCUMENTS

CN 101232578 7/2008
CN 101394460 3/2009
(Continued)

OTHER PUBLICATIONS

Frederick Nicolls: The Development of a Predictive Autofocus Algorithm using a General Image Formation Model:, Thesis, Master of Science in Engineering, Nov. 1, 1995 (Nov. 1, 1995), pp. 1-133, XP055035829, Retrieved from the Internet: URL:http//www.dip.ee.uct.ac.za/publications/theses/MScFred.pdf [retrieved on Aug. 20. 2012] the whole document.
(Continued)

*Primary Examiner* — Chuong D Ngo
(74) *Attorney, Agent, or Firm* — Jordan and Koda, PLLC

(57) ABSTRACT

Methods for determining the transfer function of a signal-processing system that do not require a known input signal. The methods are based on two representations $1(x)$ and $I_2(x)$ of an object, which the system has produced from differently scaled input signals originating from the object, or from a representation $I_1(x)$ of a first object and from a representation $I_2(x)$ of an object that is geometrically similar thereto but has been scaled differently. The representations are either given or are produced at the start of the method. According to the invention, the representations are transformed into a working space, and sections that relate to the same region of the object are selected in each case. The quotient of the functions corresponding to these two sections in the working space from which the unknown input signal comes makes it possible to clearly determine the transfer
(Continued)

function sought. Various methods are indicated for this determination. The method can be used, in particular, to improve images from electron microscopes for which there are no suitable test structures for determining the transfer function.

26 Claims, 10 Drawing Sheets

(56) References Cited

U.S. PATENT DOCUMENTS

| | | |
|---|---|---|
| 8,194,996 B2 | 6/2012 | Hasegawa |
| 2007/0036461 A1* | 2/2007 | Atherton ............... G06T 5/003 |
| | | 382/279 |

FOREIGN PATENT DOCUMENTS

| | | |
|---|---|---|
| JP | 2011-024051 | 2/2011 |
| WO | WO-2010/038411 | 4/2010 |

OTHER PUBLICATIONS

Mauricio Delbracio et al: Accurate Subpixel Point Spread Function Estimation from scaled image pairs:, hal-00624757, version 2, Feb. 22, 2012 (Feb. 22, 2012), pp. 1-32, XP055035832, oai:hal.archives-ouvertes.fr:hal-00624757 Retrieved from the Internet: URL:http://hal.archives-ouvertes.fr/hal-00624757 [retrieved on Aug. 20, 2012] the whole document.

Schowengerdt R.A., Slater P. N.: "Determination of the Inflight OTF of Orbital Earth Resource Sensors", presented at IX Congress of the International Commision for Optics, Santa Monica, California, Oct. 1972, Seiten I, II, III, 1-20.

* cited by examiner

DETERMINATION OF THE TRANSFER FUNCTION OF A SIGNAL-PROCESSING SYSTEM WITHOUT A KNOWN INPUT SIGNAL

The invention relates to methods for determining the transfer function of a signal-processing system that do not require a known input signal.

BACKGROUND OF THE INVENTION

Signal-processing systems, in particular amplifiers and optical imaging systems, generally do not function in a linear and error-free manner. The output signal I(x) represented in a space having arbitrary coordinates x is usually the convolution of the input signal O(x) and the transfer function T(x) of the system:

$$I(x) = O(x) \otimes T(x) \qquad (1),$$

wherein the operator $\otimes$ stands for the convolution. The transfer function T(x) has great technical significance for the use of the signal-processing system. If this function is known, deconvolution can be applied to I(x) in order to deduce the input signal O(x) and, therefore, the physical measured quantity contained in I(x). In imaging systems, T(x) is also referred to as a point spread function.

The functioning of the entire system is therefore improved if the transfer function T(x) is known. A prominent example thereof is the Hubble telescope, the transfer function of which contained the unavoidable optical aberrations and the effects of a systematic lens error. This transfer function was derived, thereby making it possible to correct the images captured by the telescope, which were initially entirely unusable, and to draw conclusions regarding the type and severity of the lens error. This made it possible to subsequently implement an optical correction on the telescope itself.

In order to arrive at the transfer function T(x), the system is usually acted upon by a known input signal O(x) and this is compared to the output signal I(x). In the case of telescopes, a distant star is often depicted as an object that can be described mathematically as an ideal point source using a delta function. In the case of photographing devices, illuminated pin-hole diaphragms, slit diaphragms, or stripe patterns having a variable stripe separation as the test objects are frequently used as known objects. Noise could be used at the input signal O(x) provided a mean function profile was known.

For the cameras of electron microscopes, one utilizes sharp edges as test structures (R. R. Meyer, A. Kirkland, "The effects of electron and photon scattering on signal and noise transfer properties of scintillators in CCD cameras used for electron detection", Ultramicroscopy 75, 23-33 (1998); R. R. Meyer, A. I. Kirkland, "Characterisation of the Signal and Noise Transfer of CCD Cameras for Electron Detection", Microscopy Research and Technique 49, 269-280 (2000); R. R. Meyer, A. I. Kirkland, R. E. Dunin-Borkowski, J. L. Hutchison, "Experimental characterisation of CCD cameras for HREM at 300 kV", Ultramicroscopy 85, 9-13 (2000)) and noise produced by electrons, the ensemble average of which is known (J. M. Zuo, "Electron Detection Characteristics of a Slow-Scan CCD Camera, Imaging Plates and Film, and Electron Image Restoration", Microscopy Research and Technique 49, 245-268 (2000); K. Du, K. von Hochmeister, F. Philipp, "Quantitative comparison of image contrast and pattern between experimental and simulated high-resolution transmission electron micrographs", Ultramicroscopy 107, 281-292 (2007)).

This method fails, disadvantageously, when a known test object and, therefore, a known input signal O(x) are unavailable.

The problem addressed by the invention is therefore that of providing a method for determining the transfer function of a signal-processing system that functions without knowledge of the test object and, therefore, without knowledge of the input signal O(x).

SUMMARY OF THE INVENTION

Within the scope of the invention, a method was developed for the determination of a transfer function of a signal-processing system from at least two representations $I_1(x)$ and $I_2(x)$ of an object, which the system has produced from differently scaled input signals originating from the object, or from a representation $I_1(x)$ of a first object and from a representation $I_2(x)$ of an object that is geometrically identical thereto except for a scale factor.

The coordinates x, in which the representations are depicted, can be spatial and/or time coordinates, for example. One of the coordinates x can also be energy, for example, in the case of electron energy loss spectroscopy (EELS), for instance, in which an energy loss spectrum is projected onto a CCD camera. In most cases, the energy or other coordinates used to produce the representations $I_1(x)$ and $I_2(x)$ can be traced back to spatial and time coordinates. In the case of EELS, for example, the energy dependence in the device is converted into spatial coordinates on the CCD chip of the camera. In any mention of spatially- and/or time-dependent signals in the following, these coordinates shall also represent other coordinates that can be traced back to position and/or time, without loss of generality.

An object within the meaning of this invention may, by the presence thereof, change a physical measured quantity in a spatially-dependent and/or time-dependent manner and thereby generate an input signal for the signal-processing system. For example, a sound source changes the sound intensity in space in a spatially-dependent and time-dependent manner. A photographable object changes the light intensity in space. The sound or light intensity is the input signal O(x), which is made available for signal-processing systems. The object itself need not be known.

If the input signal reaches a signal-processing system that is sensitive to this type of signal, the system delivers I(x) at the output thereof, according to equation (1). I(x) is a representation of the object that the input signal O(x) has transmitted, received under the recording or imaging conditions embodied in T(x).

Differently scaled representations can be produced from one and the same object. The scaling corresponds to the spatial or temporal sampling rate at which the signal was detected. In the case of recording sound to an analog tape, for example, the temporal sampling rate depends on how quickly the tape is running. In the case of a digital sound recording, a sampling rate is predefined and decisively determines the extent by which the file size increases per minute of recording. In the case of a camera, setting the lens to telescopic or wide-angle determines which spatial image section is projected onto the fixed number of pixels of the image sensor and, therefore, determines the spatial sampling rate. The same applies for a microscope, the spatial sampling rate of which is dependent upon the magnification step selected.

Two differently scaled representations having the same effect are also present when one representation $I_1(x)$ of a first object and one representation $I_2(x)$ of an object that is geometrically identical thereto except for a scale factor have been produced by the system. One example thereof is that of photographing two differently enlarged and sufficiently well-defined impressions of the same subject by means of a photographing device under identical imaging conditions.

According to the invention, the two representations $I_1(x)$ and $I_2(x)$ are initially transformed into a working space (having coordinate g), in which these can each be depicted as the product $$I(g)=O(g)T(g) \qquad (2)$$

of the transfer function and the unknown input signal. This working space can be the frequency space, for example, and, in order to transfer a representation thereto, the representation can be Fourier-transformed in particular. The objective of the transformation is to simplify the further computation with the representations by converting the convolution into a product according to equation (2).

The depiction of the representation in the frequency space is also referred to as a spectrum. In this space, the transfer function $T(g)$ is the equivalent of the point spread function and is referred to as the modulation transfer function.

There are special cases in which the objects need not be geometrically identical except for a scale factor, but rather in which it is sufficient for the objects to be geometrically similar. This means that rotations and/or reflections of one object relative to the other do not effect an additional difference between the representations $I_1(x)$ and $I_2(x)$.

For example, the transfer function $T(x)$ or the equivalent $T(g)$ thereof in the working space can have symmetry, in particular rotational symmetry. It is then possible to also overlap representations of two input signals $O_1$ and $O_2$, which have been rotated or reflected with respect to one another, in the real space (coordinate x) or in the working space (coordinate g). Within this context, a further simplifying scenario shall be explained: if a sufficiently large number of rotated and reflected variants are present in the image (e.g. hundreds or thousands of bacteria or hundreds or thousands of nanoclusters of atoms under the electron microscope), any azimuthal preference of the object can naturally disappear. In this case as well, the respective ensemble averages are identical except for a magnification factor, even though individual objects (individual bacterium, single cluster) within the ensemble are rotated and reflected. In this case, it is not necessary for the same region to be contained in both images (identical bacterium, or exactly this same atomic cluster), rather it is sufficient to merely determine a representative ensemble average from two different recording sites.

The latter principle is also utilized in the event that unknown noise is utilized as the input signal, since identical noise can never be detected in two consecutive recordings. It can be assumed, however, that the corresponding ensemble averages of the input signals $O(x)$ obtained in the two recordings are identical.

Sections of the two representations $I_1(x)$ and $I_2(x)$ that relate to the same region or equivalent regions of the object or objects and therefore trace back to the same unknown input signal are selected and are expressed in the working space as functions $I_1(g)$ and $I_2(g)$. In particular, it is possible to use one of the representations in its entirety as a section, and the section from the second representation that depicts the same object content as the first representation. The sections can be selected before the transformation into the working space. In special cases it is possible to make a selection after the transformation into the working space, although this is markedly more difficult.

In order to identify the sections, a similarity measure, such as the cross correlation, can be optimized, for example, wherein the position and expansion of the section from the second representation are the free parameters. If the coordinates x in the real space are discrete, it is possible, for example, to test all possible values one after the other and determine the maximum of the similarity measure.

The method does not abruptly fail if the section from the second representation does not depict the same object content as exactly as the first representation. Instead, the determination of the transfer function becomes progressively more inaccurate. The effect of the selection error is that the object contents depicted by the two representations do not overlap in a subregion. The corresponding relative error results from the ratio of the non-overlapping area to the total area of the first representation. In the first iteration, this relative error can also be assumed in the working space, for example in the frequency space.

If images subdivided into discrete pixels are selected as representations, for example, a maximum error of one-half of a pixel results for each of the two dimensions when overlapping is implemented by means of testing one after the other. If the same error is assumed for the expansion (magnification), a maximum total error of one pixel in each dimension results. If the images are square and have an edge length of N pixels, the relative error corresponds to the ratio of the number of pixels $2*N$ in the remaining non-overlapping strips to the total number $N*N$ of all pixels, i.e. $2*N/(N*N)=2/N$. In typical image edge lengths having the magnitude $N=1024$ pixels, the relative error according to this estimate is therefore in the lower per-thousand range.

The concept of the "same region" to which the two representations relate is not intended to be purely geometric. Instead, this also encompasses equivalent regions in the sense that the differences between these regions do not effect a significant difference between the representations $I_1(x)$ and $I_2(x)$. This is the case, in particular, if the input signal $O(x)$ is an ensemble average of a very large plurality of statistically distributed individual contributions, for example the light intensity emitted by hundreds of individual bacteria. Similarly, the concept of "equivalent regions" applies when $I_1(x)$ and $I_2(x)$ are not representations of the same object, but $I_1(x)$ is the representation of a first object and $I_2(x)$ is the representation of an object that is geometrically identical thereto except for a scale factor.

The quotient $Q(g)=I_2(g)/I_1(g)$ of the two functions $I_1(g)$ and $I_2(g)$ is formed, for example in a pointwise manner in the working space, and therefore the unknown input signal is suppressed and numerators and denominators each contain the transfer function sought, with differently scaled arguments. In the ideal case, the unknown input signal $O(g)$ is eliminated entirely. The quotient $Q(g)$ can be formed in the working space not only in a pointwise manner, but also across regions or along pathways, for example.

The two representations can be images $I_1$ and $I_2$ of the same object, for example, which have the representations $I_1(g)$ and $I_2(g)$ in the frequency space, as the working space. If the magnification of image $I_1$ is greater than that of image $I_2$ by the factor $\gamma$, but both images show the same section $O(g)$ of the object, the difference becomes noticeable in the magnification only in different sampling rates of the transfer function T(g). For the quotient $Q(g)=I_2(g)/I_1(g)$, the following therefore applies:

$$Q(g) = \frac{I_2(g)}{I_1(g)} = \frac{O(g)T(\gamma g)}{O(g)T(g)} = \frac{T(\gamma g)}{T(g)} \qquad (3)$$

Finally, according to the invention, the profile of the transfer function T(g) sought is evaluated on the basis of the profile of Q(g).

It was recognized that the transfer function T(g) can be determined in this manner without the nominal input signal O(g) being known. A noise having no context whatsoever, about which a mean function profile is not known, can even be used as the input signal. According to the prior art, precisely this knowledge was required in order to arrive at T(g) by converting from equation (2) to T(g)=I(g)/O(g); if only I(g) is known, it is not possible to determine either O(g) or T(g) without any additional knowledge (the "blind deconvolution" problem). In the case of telescopes, for example, this knowledge was acquired by sighting a very distant star, which can be approximately considered to be a point source. In the case of microscopes, test samples having known structures were imaged. By comparison to the "blind deconvolution" situation, given that the different scaling of $I_1$ and $I_2$—as the only additional knowledge—is used and, therefore, knowledge of O(g) is no longer required, it is made possible for the first time to determine T(g) for signal-processing systems for which suitable test objects are unavailable.

In the case of an electron microscope that magnifies as far as atomic dimensions, for example, it is not possible to depict well-defined objects since test objects cannot be prepared in atomic dimensions in a defined manner. According to the prior art, electron optics are bypassed and a sharply defined edge is placed directly on the detector, bypassing electronic optics, or, alternatively, a sharply defined shadow is projected onto the detector. Since the object spectrum O(g) of an ideally distinct intensity level is known, the transfer function T(g) of the CCD camera can be determined from the intensity distribution I(g) measured. The noise method is also used, in the case of which the CCD camera is uniformly illuminated with electrons. Due to the statistical character of the number of incident electrons per pixel, the input signal O(g) is white noise. This known input signal can be compared with the output signal I(g) recorded by the camera in order to determine the transfer function T(g) according to T(g)=I(g)/O(g). Both methods result in certain difficulties in the case of electron microscopy. In the edge method, the evacuated microscope column usually must be opened in order to place an object having a sharply defined edge onto the camera. In addition, the orientation of the sharply defined edge along the pixel rows must be well defined, which is hardly achievable with a typical case of 2048 pixels of a size 15 micrometers along one dimension. Problems can also result since the edge has a certain physical thickness and electrons can therefore also be scattered by the edge onto the detector, or x-ray quanta can occur at the edge and be registered by the detector, which is unwanted. The use of the noise method is also problematic since, although the relative functional profile of the transfer function T(g) can be determined, an absolute scaling of T(g) is not possible.

In electron microscopy, it is therefore possible for the transfer functions of one and the same CCD camera determined by means of the two methods to deviate considerably from one another. Due to these uncertainties in the determination of the transfer function, an exactly quantitative image evaluation that often utilizes a comparison with numerically calculated image simulations is made difficult or even impossible. The possibility created according to the invention of providing a third alternative measurement method for determining the transfer function T(g) makes it possible to clarify the discrepancies in the determination of the transfer function in electron microscopy and to increase the accuracy in quantitative image evaluation. The method according to the invention can be used not only during operation of the signal-processing system. In fact, T(g) can also be determined from old representations (e.g. images) that have been produced by the system, even if the system itself has long since ceased to exist, but the images do still exist, without further recordings related thereto.

If two images exist that show the same object at different magnifications, this is sufficient for determining T(g), and this knowledge can be used to subsequently improve all other available images. For example, recordings from space probe missions that ended long ago can be reevaluated with the aid of the method according to the invention, so that decades-old material yields new findings even today and, in the extreme case, renders a new mission superfluous.

Zeroes of $I_1(g)$ in the denominator of equation (3), which trace back to zeroes in the transfer function T(g), are unproblematic. These are characterized in that $I_1(g)$ decreases asymptotically to zero. Due to the retardation of $I_2(g)$ relative to $I_1(g)$, $I_2(g)$ has the zeroes of $I_1(g)$ at smaller values of g. Starting at g=0, therefore, if the values of $I_1(g)$ asymptotically approach zero, this has already occurred in the numerator of $I_2(g)$ of equation (3), and therefore the quotient Q(g) is well defined.

Other zeroes of $I_1(g)$ that trace back to zeroes in the input signal O(g) or to oscillatory behavior of the transfer function T(g) can be managed by excluding these singularities from the calculation of T(g). In the case of a parameterized approach for T(g), in particular, a certain smoothness of the profile of T(g) is required, for example in the form of continuity or the maximum curvature. It can therefore be assumed, with good reason, that the solution that applies for the preponderant portion (≥95%) of the working space also applies for the singularities. In particular, regions in which very large values of the quotient Q(g) or derived quantities, such as ln [Q(g)] or D(g), occur can be excluded from the calculation of T(g). It should be kept in mind that the singularity was produced artificially by means of the division according to equation (3), while the curves T(γg) and T(g) themselves do not contain a singularity and thus are entirely "harmless" and are continuous.

In the following it is shown that the transfer function T(g) sought can be clearly determined from the expression for Q(g). Without loss of generality, only one spatial dimension g is taken into consideration, wherein this spatial dimension relates to the coordinate system of the first representation $I_1(g)$.

In a first step, the quotient curve Q(g) is logarithmized. The quotient of T(γg) and T(g) therefore results in a difference of the logarithms involved, namely $$\ln [Q(g)] = \ln [T(\gamma g)] - \ln T[(g)] =: \Delta \ln [T(G)]. \qquad (4)$$

It was thus assumed that Q(g)>0, without loss of generality. The case distinction for Q(g)≤0, which can occur in the case of an oscillating transfer function T(g), was omitted for clarity.

The difference of the two logarithms ln [T(γg)] and ln [T(g)] is characterized here with the symbol Δ ln [T(G)] and is assigned to the arithmetic frequency center point G located between the frequencies γg and g, which is defined by $$G = g(1+\gamma)/2 \qquad (5)$$

The abscissa difference ΔG associated with the ordinate difference Δ ln [(T(G)] results as the difference of the participating frequencies γg and g, and therefore the expression $$\Delta G = g(\gamma-1) \qquad (6)$$

is obtained for the associated abscissa difference ΔG. The calculation of the two differences Δ ln [T(G)] and ΔG is illustrated graphically in FIG. 4 in the "Specific Description" part. Finally, the ordinate difference Δ ln [T(G)] from equation (4) and the abscissa difference ΔG from equation (6) can be used to calculate a difference quotient D(G), which can be defined as follows:

$$D(G) = \frac{\Delta \ln[T(G)]}{\Delta G} \qquad (7)$$

The difference quotient D(G), which is shown in FIG. 4 as an example, can be calculated by reference to the reference system of the first representation up to the spatial frequency $g = g_N(1+1/\gamma)/2$, wherein $g_N$ is the Nyquist frequency of the first representation.

It is decisive that the difference quotient D(G) calculated in this manner is a finite approximation of the derivative of the logarithm of the transfer function T(G) according to the spatial frequency G, i.e.

$$D(G) \approx \frac{d \ln[T(G)]}{dG} = \frac{1}{T(G)} \frac{dT(G)}{dG} \qquad (8)$$

This approximation can be used to clearly determine the transfer function T(G) from the difference quotient D(G).

With respect to the solution path, a distinction is made between two cases: in one case, the frequency G can be considered to be a continuous variable, which makes direct integration of equation (8) possible and thereby ensures a simple glimpse into the general solution principle. In the other case, in the approach of numerical calculation, the values of D(G) are present only at discrete frequencies G, however, which makes it necessary to perform discrete summation instead of continuous integration, wherein special attention must be paid to the metrics of the frequencies G obtained.

If the frequency G is considered to be a continuous variable, the logarithm of the transfer function ln [T(G)] is approximately obtained by the integration of D(G), i.e.

$$S(G) = \int_0^G D(G') dG' \approx \ln[T(G)], \qquad (9)$$

and the transfer function T(G) sought results via exponentiation, and therefore $$T(G) \approx \text{Exp} [S(G)]. \qquad (10)$$

The integration constant usually present in equation (9) was omitted, since it is exactly 0. This is the case since, proceeding from the physically reasonable assumption that T(0) must be equal to 1, then S(0) must be equal to 0, which is to say the integration constant in equation (9) must also be 0.

According to a generalized depiction of the solution path for continuous frequencies, the approach of numerical calculation must now be applied, in which the input curve Q(g) according to equation (3) is present only at certain discrete values of g. The latter case is typical for frequency spectra that were obtained via FFT (fast Fourier transform). The representations $I_1$ and $I_2$ are images, for example, which were recorded using a CCD sensor subdivided into discrete pixels. In the case of a real-space field comprising N pixels, it is then possible to index the associated discrete frequencies of the Fourier space according to FIG. (3) by means of whole-number values n=0, ±1, ±3 . . . ±$n_N$, wherein the index $n_N$ designates the Nyquist frequency. The index n of a certain frequency corresponds to the number of periods of the associated planar wave Exp [2iπn/N] that become disposed in the real-space field of the number of pixels N. If image 1 is selected as the reference image, one can set g=n=0, ±1, ±3 . . . ±$n_N$, proceeding from equation (3). It is therefore no longer possible to maintain whole-numbered arithmetic, since the introduction of the amplification ratio γ according to equation (5), which is generally not whole-numbered, results in the occurrence of intermediate frequencies G, which follow neither the whole-numbered metric of image 1 nor that of image 2, but rather that of an image having a magnification located between image 1 and 2. The occurrence of intermediate frequencies G is therefore a consequence of the alternating, symmetrical handling of images 1 and 2. After introducing a dimensionless index g=n=0, ±1, ±3 . . . ±n in equation (3), however, the calculation can be carried out exactly as previously described, up to equation (7), wherein arbitrary rational values now occur for G and ΔG, in general, rather than whole-numbered, dimensionless values in the sense of an index or an index difference. One of several possibilities for restoring the whole-numbered metric of image 1 selected as the reference, which is required for the numerical calculation, is described in the following.

Once g=n=0, ±1, ±3 . . . ±$n_N$ has been inserted in equation (3) and the difference quotients D(G) are now disposed at non-whole-numbered, dimensionless values of G, it is obvious to use these values of G as support points for an interpolation method, by means of which the difference quotients D(G) at the desired frequencies G=n=0, ±1, ±2 . . . can be calculated. This interpolation of D(G) can be formally expressed as $$D(G \in \mathfrak{R}) \to D(n \in N). \qquad (11)$$

If the difference quotients D(n) thusly obtained at whole-numbered support points as $D_n$, and, similarly, T(k) as $T_k$, and S(k) as $S_k$, the infinitesimal integration of equation (9) now becomes a summation, wherein the following applies:

$$S_k = \sum_{n=0}^{k} D_n \approx \ln[T_k]. \qquad (12)$$

Finally, similarly to equation (10), the solution sought for the transfer function $T_k$ at the frequency of the reference image 1 indexed with the whole number k is obtained, as $$T_k \approx \text{Exp} [S_k]. \qquad (13)$$

In a particularly advantageous embodiment of the invention, therefore, the logarithm of Q(g), which is defined continuously or at discrete support points, is used to form a difference quotient for the logarithm of T(g), which is defined continuously or at discrete support points. This is advantageously integrated or summed. On the basis of the differently scaled representations, it is therefore possible to obtain an independent value for the transfer function T(g) as the solution directly for each support point in the working space, without T(g) being limited from the start to a certain class of functions.

At high spatial frequencies g, it is possible for ΔG to become too great in the denominator of equation (7), which increases with the spatial frequency g according to equation (6). The approximation that D(G) is considered to be a derivative of ln [T(G)] at the point G becomes inaccurate. In turn, this reduces the accuracy with which T(G) can be determined from the difference quotient D(G) by summation or integration. Although this is rarely the case in typical transfer functions, which usually vary slowly, such inaccuracies could occur in a typical transfer functions that are highly curved or even oscillate at high spatial frequencies due to the rigidly prescribed frequency differences ΔG. The more closely the two functions $I_1(g)$ and $I_2(g)$ are located to one another in terms of the scaling thereof, the lesser these inaccuracies are.

At low spatial frequencies, very small values occur in the numerator and in the denominator of the difference quotient according to equation (10) at low spatial frequencies since typical transfer functions vary slowly as a rule. Strong noise in the representations (images) can then dominate the difference quotients. The further apart the two functions $I_1(g)$ and $I_2(g)$ are disposed in terms of the scaling thereof, the greater ΔG becomes in the denominator of equation (7) and the more the influence of the noise is suppressed.

The value of γ therefore results in an unavoidable compromise between the accuracy at high spatial frequencies and the accuracy at low spatial frequencies.

In a further advantageous embodiment of the invention, in order to calculate the difference quotient for a position g in the working space, two sections of different representations and, therefore, two functions $I_1(g)$ and $I_2(g)$, are selected from a plurality of at least three representations, wherein these functions differ from one another by a predefined scale factor γ.

If a single magnification factor γ does not permit a sufficiently good compromise to be found that allows the difference quotient to be calculated with sufficient accuracy at low frequencies as well as high frequencies, it is possible to utilize a plurality of images that are related to one another at different magnification ratios γ. By means of the adaptive choice of γ for various positions g in the working space, the difference quotient from equation (7) can be calculated at any desired point on the frequency axis such that this can be used, according to equation (8), as a reliable and sufficiently accurate approximation of the differential quotient. In the case of oscillating transfer functions in particular, the support points for calculating the difference quotient must be located so close together (small ΔG) that one complete oscillation does not take place within one span ΔG. Otherwise, the clear case of subsampling is present at higher frequencies. A multiple-image method having a plurality of different magnifications is therefore always advisable here.

The portion of the working space over which the transfer function T(g) can be determined depends on γ (cf. FIG. 4d). In the two-dimensional case for γ=2, the transfer function can still be determined on 56.25% of the working space, and on 75% of the working space in the one-dimensional case. The range 1≤γ≤2 has proven to be advantageous in this regard.

In the two-dimensional case, the utilization of the working space can be improved by continuing the evaluation not just to the one-dimensionally defined Nyquist frequency, i.e. to the edge of the spectrum, but rather to the √2-fold thereof, i.e. Into the corners of the spectrum. If the objective is to determine the transfer function T(g), without any loss of frequency, to the one-dimensional Nyquist frequency, values of γ of up to 2.41 are permissible.

If $I_1(g)$ and $I_2(g)$ are azimuthally averaged in order to suppress noise before calculating Q(g), the side effect must be taken into account here that this averaging in the direction of the corner of the frequency space is possible in an increasingly limited angular range, which shrinks to zero for the corner pixel itself.

Frequencies above the half Nyquist frequency are typically considered to be high spatial frequencies. In the case of discrete sampling, these frequencies have an index $n>n_N 2$, wherein $n_N$ is the index of the Nyquist frequency. Low spatial frequencies can be delineated by means of the criterion that the separation of these frequencies should be at least 1 pixel in the case of discrete sampling. In other words: the difference quotient should be calculated at least across the distance of 1 pixel. The following therefore applies: γn−n=n(γ−1)>1, that is, n>1/(γ−1), wherein n represents the discrete indexing of the frequencies. For γ=1.1, one obtains n>10, for example, and for γ=1.5, one obtains n>2, and for γ=2, one obtains n>1. Frequencies that are smaller than the stated n can be reliably considered to be low frequencies, i.e. frequencies for which the following applies: n<1/(γ−1). This is the lowest limit in the case of noise-free representations (images). If noise occurs additionally, the related uncertainty should be taken into account. Frequencies with n<10 are typically considered to be low frequencies.

If the working space is the Fourier space, then, due to the limited possibilities for determining noise, the values of Q(g) for low frequencies g are accompanied by particularly large statistical error bars. Since the representations $I_1(g)$ and $I_2(g)$ typically have a strong gradient near 0 in the Fourier space for g, systematic errors can also be amplified there. This can be advantageously counteracted by extrapolating Q(g) for low frequencies g from values for adjacent higher frequencies g.

In a further advantageous embodiment of the invention, a parameterized approach is implemented for the transfer function T(g) and is optimized by means of an optimization procedure such that the quotient Q(g) or a function profile derived therefrom is best reproduced from T(g). Since it was previously proven that an unambiguous solution exists for T(g), then a solution for T(g) that was found by means of optimization and that exactly reproduces Q(g) or a function profile derived therefrom must be this unambiguous solution. The logarithm of the quotient ln [Q(g)] from equation (4) or the difference quotient D(G) from equation (7), for example, are suitable for use as a derived function profile.

In one embodiment, T(g) can be optimized to the best possible agreement of the quotient T(pg)/T(g) with the quotient according to equation (3) obtained from $I_1(g)$ and $I_2(g)$, wherein p is a scale factor. Advantageously, the scale factor γ that is previously known or was set in the preparation of the representations $I_1(x)$ and $I_2(x)$, wherein these representations differ by this scale factor γ, can be advantageously set as the value for this scale factor. The value of p can be determined within the scope of an optimization procedure. A combination is also possible. A prerequisite thereof is that, if p is changed, the sections $I_1(g)$ and $I_2(g)$ are adapted accordingly by selecting an appropriate region in the real space, and that detection of an incorrect region selection is provided.

A parameterized approach for the transfer function can be created, for example, by means of a linear superposition of Gaussian curves, decreasing exponential functions, Lorentz functions or similar functions, wherein the number of parameters used, by means of which the weighting factors of the participating functions and the width thereof are described, is typically less than 10. Due to the parameterized approach, the class of possible functions $T(g)$ that could be obtained as the solution is limited. As a trade-off, however, the approach is more robust with respect to noise in the representations $I_1(g)$ und $I_2(g)$. It is thereby possible to at least partially counteract the tendency of a deconvolution method to amplify this noise. After an extremely noisy solution is received, a smoothing procedure must be applied in most cases, which links adjacent discrete frequencies of the transfer function to one another in the sense of local averaging.

In a further advantageous embodiment of the invention, before transformation into the working space, the representation having the least expansion in the real space is interpolated up to the expansion of the other representation. The two representations can then be transferred into the working space with a transformation of the same dimension. This is achieved in that the interpolation itself is a transfer function that accompanies only one of the two representations. The influence thereof on the final result must be characterized and depends on the magnitude of the interpolation.

Similarly, one of the representations can be rotated and/or reflected in the real space before the transformation into the working space. It is then possible to compensate for an existing rotation and/or reflection between two otherwise identical representations. In the event that the transfer function $T(g)$ is rotationally symmetrical, it is therefore possible to also overlap representations that differ in terms of different scaling and in terms of rotation and/or reflection, thereby making the quotient formation according to equation (3) possible. It must be taken into consideration that the rotation and reflection introduce further additional transfer functions that accompany only one of the two representations. If the real space is subdivided into discrete pixels, the result of the rotation and/or reflection also generally does not become disposed on whole-numbered pixel coordinates; it is then necessary to perform an interpolation that introduces a further transfer function.

The rotation and/or reflection can be carried out, for example, in that the quotient formation according to equation (3) is modified such that the quotient $Q(g)=I_2(g)/I_1(Dg)$ is formed, wherein D is the transformation matrix of the rotation and/or reflection. If the functions $I_2(g)$ and $I_1(g)$ in the working space are sufficiently smooth, then the additional interpolation to whole-numbered pixel coordinates can be omitted, at the least.

In a further advantageous embodiment of the invention, the representations in the working space are transformed into polar coordinates and are azimuthally averaged in this representation. The assumption that the transfer function sought is a rotationally symmetrical function is often justified. This is the case with electron microscopic images, for example. It was found that division according to equation (3) is unstable, in particular when the representation $I_1(g)$ used as the divisor is very noisy. The noise can be amplified by the division, which, in turn, influences the accuracy with which calculation from $Q(g)=T(\gamma g)/T(g)$ back to $T(g)$ is performed. In special cases, it can therefore be advantageous to smooth the representations in advance by means of the averaging. A one-dimensional function $I'(g)$ is thereby obtained, wherein the azimuthal averaging of the complex-valued Fourier coefficients $I(g,\phi)$ can be described as follows, for example:

$$I'(g) = \left(\frac{1}{2\pi}\int_0^{2\pi}|I(g,\varphi)|^2 d\varphi\right)^{1/2} \quad (14)$$

This azimuthal averaging is expressly not an absolute prerequisite for being able to calculate a transfer function $T(g)$ according to equations (4) to (13) in one spatial dimension. The general problem of determining this function in two or more dimensions in a pointwise manner can always be traced back to one dimension in polar coordinates by disassembling into independent, one-dimensional radial sections through the coordinate origin, even if azimuthal averaging was not previously carried out. Azimuthal averaging is merely one option in the special case that the transfer function $T(g)$ is rotationally symmetrical.

The smoothing achieved by means of the azimuthal averaging can result in a systematic increase in the thusly obtained curve $I'(g)$ since the absolute value squaring in the integrand of the integral (14) always contains a positive quadratic noise term. This possible systematic noise contribution can be removed separately if the noise spectrum $N(g)$ that is actually present is known. The image intensity $I'(g)$ can be corrected by quadratic subtraction of the noise spectrum, thereby resulting in the expression for the noise-corrected image intensity $I(g)$:

$$I(g)=(I'(g)^2-N(g)^2)^{1/2} \quad (15)$$

The noise contribution $N(g)^2$ from equation (15) across virtually the entire spatial frequency region is often a great deal smaller than the contribution $I'(g)^2$ dominated by the signal, and the correction according to equation (15) is first even noticeable in the outermost, high-frequency regions of a spectrum, where the object spectrum and the transfer function take on very small values. Since the correction is effective only across a relatively narrow spatial frequency range at the edge of the Fourier transform, it can be assumed that the noise spectrum $N(g)$ does not change significantly across this narrow range and can be approximately replaced by a constant c. In such a case, one can use the following approximately simplified expression, instead of equation (15), for the noise correction:

$$I(g)\approx(I'(g)^2-c^2)^{1/2} \quad (16)$$

A noise spectrum or, alternatively, a constant noise background is therefore advantageously corrected out of the azimuthally averaged representations.

Alternatively or in combination with the azimuthal averaging, it is possible to average a plurality of identically scaled representations either in the real space or in the working space before the quotient formation according to equation (3). This average is then used in the further procedure as a representation $I1(x)$ or $I1(g)$, or $I_2(x)$ or $I_2(g)$, respectively. This alternative possibility is particularly important in the case in which the transfer function $T(g)$ is not rotationally symmetrical, because azimuthal averaging is not permitted in that case.

In order to further suppress noise, the representations $I_1(g)$ and $I_2(g)$ can also be smoothed by means of local convolution before the quotient formation according to equation (3).

Within the scope of the invention, a further method for determining the transfer function of a signal-processing system was developed. This method differs from the method according to the main claim in that input data $I_1(x)$ and $I_2(x)$ are not yet present, but rather only the signal-processing system itself. By means of this method, the system is therefore used to first produce:

a) at least two differently scaled representations $I_1(x)$ and $I_2(x)$ of an object or b) at least one representation $I_1(x)$ of a first object and a representation $I_2(x)$ of an object that is geometrically identical thereto except for a scale factor.

The previously described method is then carried out with these representations.

The two representations $I_1(x)$ and $I_2(x)$ can be obtained in the following manner, for example:

Alternative a):

One and the same object is used to produce two differently scaled representations $I_1(x)$ and $I_2(x)$ thereof. There are two possibilities for this:

1. In a further advantageous embodiment of the invention, the different scaling of the representations $I_1(x)$ and $I_2(x)$ is set by changing the scaling of the input signal $O(x)$ generated at the input of the system. This means that the differently scaled representations are produced on the detector of the system with the aid of the signal-processing system. In the case of an (electron) microscope, the magnification can be changed, for example, and therefore differently magnified images of the same object are obtained. The use of the optical zoom function in a photographing device has a similar effect, wherein it must be ensured that the imaging properties of the lens are not significantly changed by the zoom procedure. In the case of an EELS measurement, the magnification is determined by the dispersion set on the spectrometer. The greater the dispersion is, the greater the extent is by which the spectrum is spatially expanded on the CCD of the camera when the energy is changed. As a result, the sampling rate of the camera relative to the energy becomes greater and the spectrum can be determined with a greater energy resolution. This corresponds to a higher magnification level in the photographic or microscopic image recording.

2. In a further advantageous embodiment of the invention, the different scaling of the representations $I_1(x)$ and $I_2(x)$ is set by changing the spatial separation between the object and the signal-processing system. The signal-processing system itself remains unchanged, in contrast to the previous embodiment, and already receives two differently scaled input signals $O(x)$. A typical application is to record one and the same object from various distances by means of a photographing device without changing the settings of the photographing device.

Alternative b):

Two or more objects or signal forms that are actually present are used as the input signal, which have a mutually identical shape (function profile) but a different expansion (scaling). One example thereof is that of photographing two differently enlarged and sufficiently well-defined impressions of the same subject by means of a photographing device under identical imaging conditions. The distance from the signal-processing system and the settings of the system itself can remain unchanged.

In addition, in association with embodiment 1 of Alternative a), in particular, noise can be used instead of a conventional object as the input signal, although it is no longer necessary to know the functional profile of the noise spectrum. In contrast to the prior art, therefore, an arbitrary noise signal can be used as the input signal in that this is registered in at least two differently scaled variants.

In a further advantageous embodiment of the invention, at least one of the representations $I_1(x)$ and $I_2(x)$ is produced as an aggregation of at least two single representations. For example, a plurality of images can be recorded in succession using one photographing device or an (electron) microscope at identical settings. The single representations can be added directly in the real space. Alternatively, sections can be selected from the individual representations and the equivalents thereof in the working space can be combined to form the functions $I_1(g)$ and $I_2(g)$.

With regard for an electron microscope as the signal-processing system, it should be noted that the change in magnification is induced by the series-connection of the so-called intermediate lenses and the so-called projector lens, which are considered to be error-free. These lenses are therefore optically "neutral" and function in the sense of a mathematically ideal magnification; the object function is merely rescaled relative to the detector. Due to the optical neutrality of these lenses, a transfer function measured using the method depicted here corresponds only to the transfer function of the detector and is no longer influenced by the upstream lens system (see FIG. 1 in the Specific Description).

With regard for a photographing device as the signal-processing system, it should be noted that the transfer function is composed of a contribution from the camera lens and a contribution from the film or the CCD sensor (see FIG. 1 in the Specific Description). It is important here that the contribution of the camera lens does not change between the individual pictures. In the second possibility of Alternative a), this can be achieved in that the object is located beyond the so-called hyperfocal distance in all pictures, whereby it is no longer necessary to "focus" the individual pictures individually. In this manner it is possible to obtain differently magnified and sufficiently distinct pictures of one and the same distantly located object merely by changing the separation with the "infinite" distance setting. In Alternative b), the contribution of the camera lens can be held constant by using two differently magnified and sufficiently well-defined impressions of an arbitrary subject as the object, given a fixed object distance.

Within the scope of the invention, a further method for determining the transfer function $T(x)$ of a signal-processing system and the input signal $O(x)$ was developed, which an unknown object produces at the input of this system from at least two representations $I_1(x)$ and $I_2(x)$ of the object, which the system has produced from different scalings of this input signal $O(x)$.

The different scalings of the input signal $O(x)$ can be produced in any of the above-described methods. In particular, the system itself can scale this input signal, or one representation $I_1(x)$ of a first object and a representation $I_2(x)$ of an object, which is geometrically identical thereto except for a scale factor, can be used as the representations $I_1(x)$ and $I_2(x)$. The two representations can be specified as input data, in a manner analogous to the aforesaid and similar to the method according to the main claim, or these can be produced at the beginning of the method, as is the case with the method according to the alternative dependent claim.

According to the invention, parameterized approaches for the object function $O(x)$ and for the transfer function $T(x)$ are optimized in a self-consistent manner such that T(x) applied to O(x) reproduces the two representations $I_1(x)$ and $I_2(x)$.

Since the object function O(x) can also be obtained, once the transfer function T(x) has been determined, by means of deconvolution of image 1, for example, all the information about the object function O(x) and the transfer function T(x) is contained in the input data comprising the representations $I_1(x)$ and $I_2(x)$. By means of the system of equations set up according to the invention $$I_1(x) = O(x) \otimes (x)$$

$$I_2(x) = O(x) \otimes (\gamma x)$$

both functions O(x) and T(x) sought can be determined simultaneously. In this method, explicit use is not made of the quotient curve according to equation (7) and the functional relationships of equations (8) to (14) derived therefrom. If an object function and a transfer function that reproduce the input data comprising image 1 and image 2 are successfully found by testing or by applying an arbitrary numerical optimization method, then the solution found is unambiguous.

This method is a logical generalization of the previous method. All measures disclosed for the previous methods can therefore also be applied to this method. In particular, the magnification factor γ can also be incorporated into the optimization. The optimization can take place in the real space or in a working space, wherein the working space can be the frequency space, in particular.

Compression methods can be used to bring the number of parameters for the object into the range of 100. In this case, optimization methods such as gradient methods, simulated annealing or genetic algorithms are entirely capable of reliably finding a solution.

The subject matter of the invention is explained in the following with reference to figures, without the subject matter of the invention being limited thereby.

DETAILED DESCRIPTION OF THE PREFERRED EMBODIMENTS

Figure 1:
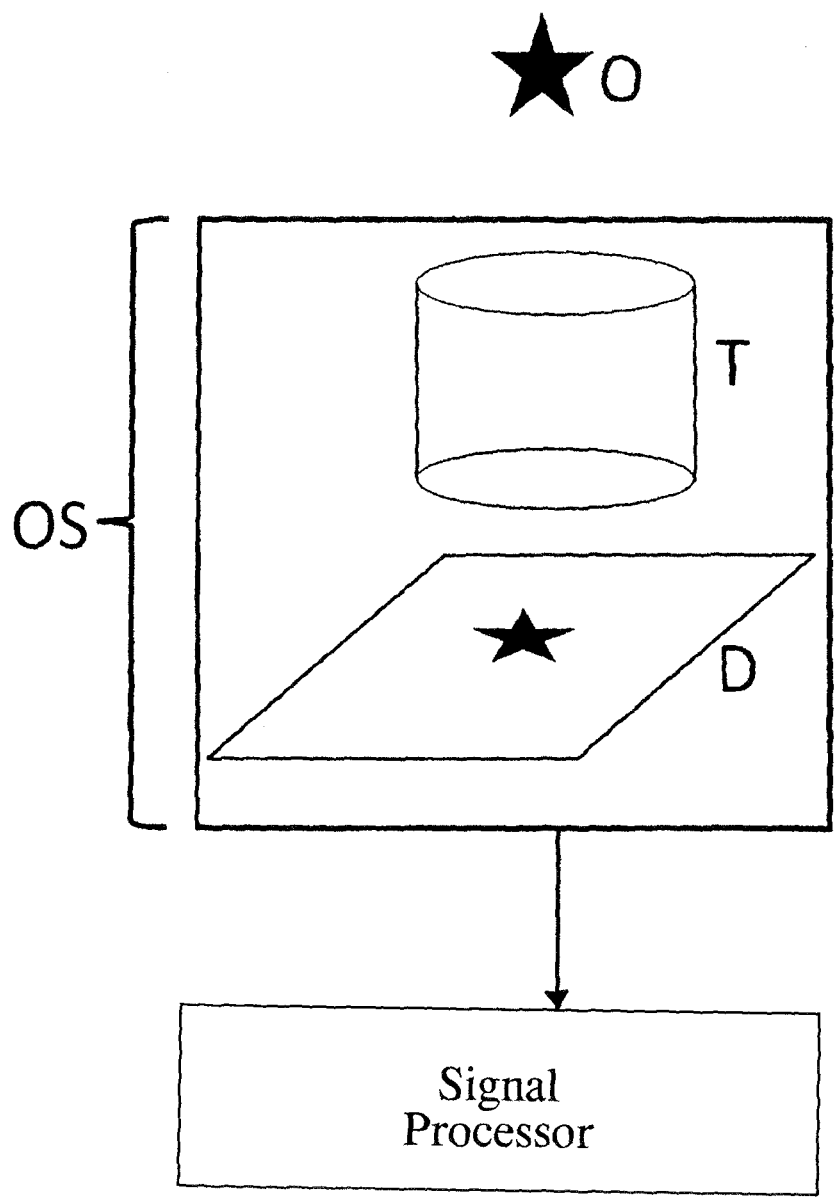
FIG. 1: shows an optical imaging system as an example of a signal-processing system.

FIG. 1 illustrates an optical system OS providing an input to a signal processor so as to be regarded as a signal-processing system. The optical system comprises a transfer system T and a detector D. The transfer system T projects the light emitted by the object O onto the detector D, and therefore a sharp image appears there. The transfer function of the optical system comprises a contribution from the transfer system T and a contribution from the detector D.

Figure 2:
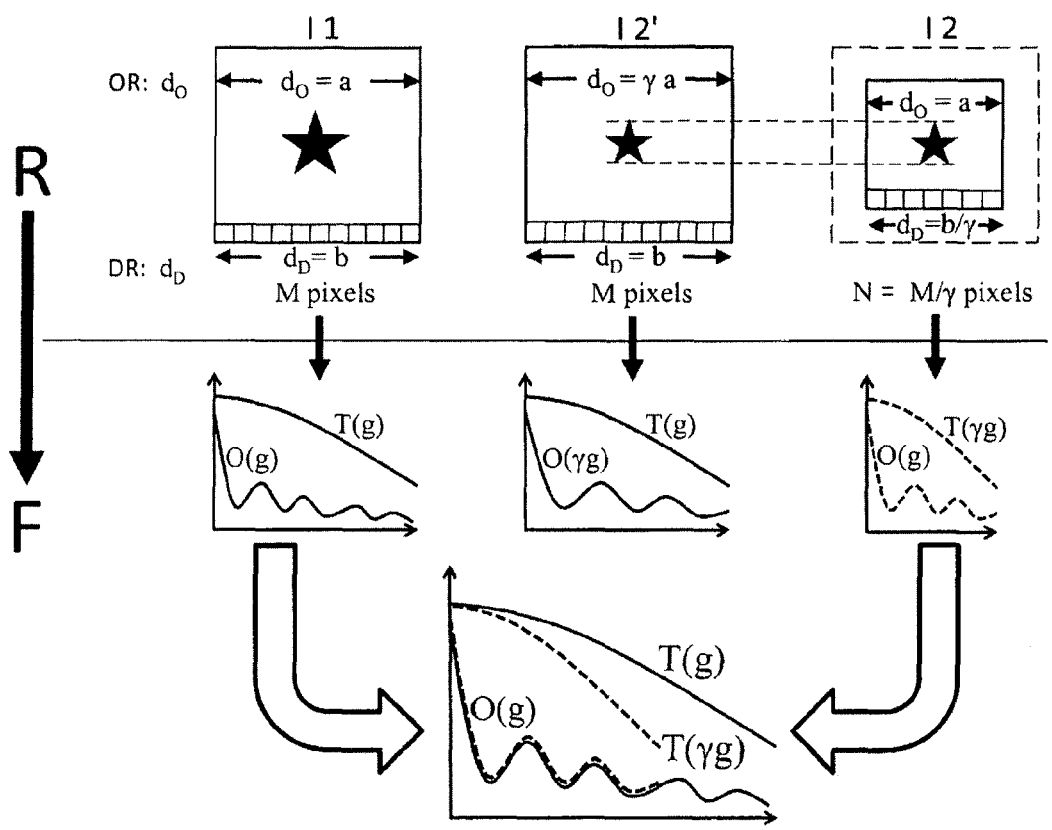
FIG. 2: shows an illustration of the method according to the invention.

FIG. 2 illustrates the implementation of the method according to the invention. Without loss of generality, it is assumed here that the detector has square dimensions, wherein, in principle, detectors having other dimensions are not ruled out. The detector comprises M×M pixels and has the physical dimension $d_D$=b pixels (detector reference DR) along one direction. What is shown are two pictures I1 and I2', as representations of the same object, which were taken by means of this detector and which were taken at different magnifications. The picture I1 was taken at an arbitrary magnification and contains an object region having the expansion $d_o$=a nanometers (object reference OR). The picture I2' was taken at a magnification that differs with respect to I1 by the factor 1/γ. Without loss of generality, it should be assumed here that γ>1 which, in the present case, means that the magnification of I2' is less than that of I1. Due to the lower magnification of I2', I2' therefore contains an object region which is greater than I1 along one dimension by the factor γ, i.e. I2' contains an object region having the expansion $d_o$=γa.

It is now possible to select a region on I2' that corresponds precisely to the dimensions of the object region detected on I1 with respect to the dimension of the object region shown.

The positioning of the region selected in I2' can then be selected such that the entire I1 and the selected region I2 of I2' represent exactly the same object region. The thusly performed selection of an image section in I2' corresponds to a hypothetical physical size reduction of the detector from the actual physical dimension $d_D$=b thereof to the dimension $d_D$=b/γ. It is important to mention that this size reduction is carried out not by scaling the pixels, but rather by omitting edge pixels at the same pixel size. Since a detector is usually formed of discrete pixels, N=NINT(M/γ) for the smaller number of pixels N of the hypothetical detector obtained in this manner, wherein the function NINT refers to the next whole number. At a sufficiently large value for N, which is typically greater than 1000 in the case of common image detectors, the error that occurred at any γ due to the whole-number NINT rounding relative to a section selection that is exactly congruent can usually be disregarded.

In the next step, the images from the real space R are transformed into the Fourier space F, wherein I1, which comprises M×M pixels, is subjected to a discrete M×M Fourier transformation. The congruent I2, which has been reduced to the size N×N, is subjected to a N×N Fourier transformation. The middle row of FIG. 2 contains, from left to right, the spectra of the object function O(g) and the transfer function T(g) for the images I1, I2' and I2.

The Fourier transformation can be calculated using the FFT (fast Fourier transform) algorithm. Since, in particular, N is not necessarily a power of 2, many common FFT programs are not suitable, since these are often based on a relation M,N=$2^n$ (radix 2 algorithm). However, a so-called mixed-radix FFT algorithm can always be used, with which it is possible to reduce N into general prime numbers that are not necessarily 2. In a favorable reduction of N into several small prime numbers, the mixed-radix algorithm can achieve a level of computational efficiency that is very close to that of the radix-2 FFT algorithm. In the least favorable case, if N itself is a prime number, the efficiency of the mixed-radix algorithm is reduced to the efficiency of a direct Fourier transformation. Finally, however, it is always at least possible to use a direct Fourier transformation for arbitrary numbers M, N. At a typical magnitude of N≈$10^3$, even the least favorable case of a direct Fourier transformation is no longer a problem for modern computers. At magnitudes of N≈$10^4$, an additional artificial increase or decrease of N by, typically, ±1 could improve the reducibility into prime numbers and the computing speed, wherein the scaling error of approximately $10^{-4}$, which occurs due to the artificial rounding, is also negligible in most practical applications.

In order to ensure better understanding of the method, two scenarios are compared in the following, with reference to FIG. 2, wherein the first scenario does not include region selection in I2', but the region selection explained above is carried out in the second scenario.

If the entire I2' and the object expansion $d_o=\gamma a$ thereof, and the original detector expansion $d_D=b$ thereof had been subjected to a discrete M×M Fourier transformation without doing anything else, similar to I1, the object spectra belonging to I1 and I2' would deviate from one another, because they are scaled differently and because the object regions that contribute to the respective transform are not identical. In contrast to the object spectrum, however, the transfer function given solely by the detector would be identical for both images, since this does not depend on the image content, but rather only on the detector, which is used in an identical manner in both cases (see the column in the middle in FIG. 2).

The reverse applies in the case of the comparison of the Fourier transforms of I1 and I2 after reduction of I2' to the object expansion $d_o=a$ with the associated hypothetical detector expansion $d_D=b/\gamma$ and the associated number of pixels N. Now, despite the fact that a different magnification was originally selected, identical object frequencies are once more disposed at identical frequencies of the Fourier transforms, while the associated coefficients of the transfer function are no longer disposed on identical frequencies. In both of the scenarios mentioned, the object spectrum and the spectrum of the transfer function have therefore swapped roles in terms of their mutual fit (see the column on the right in FIG. 2).

Figure 3:
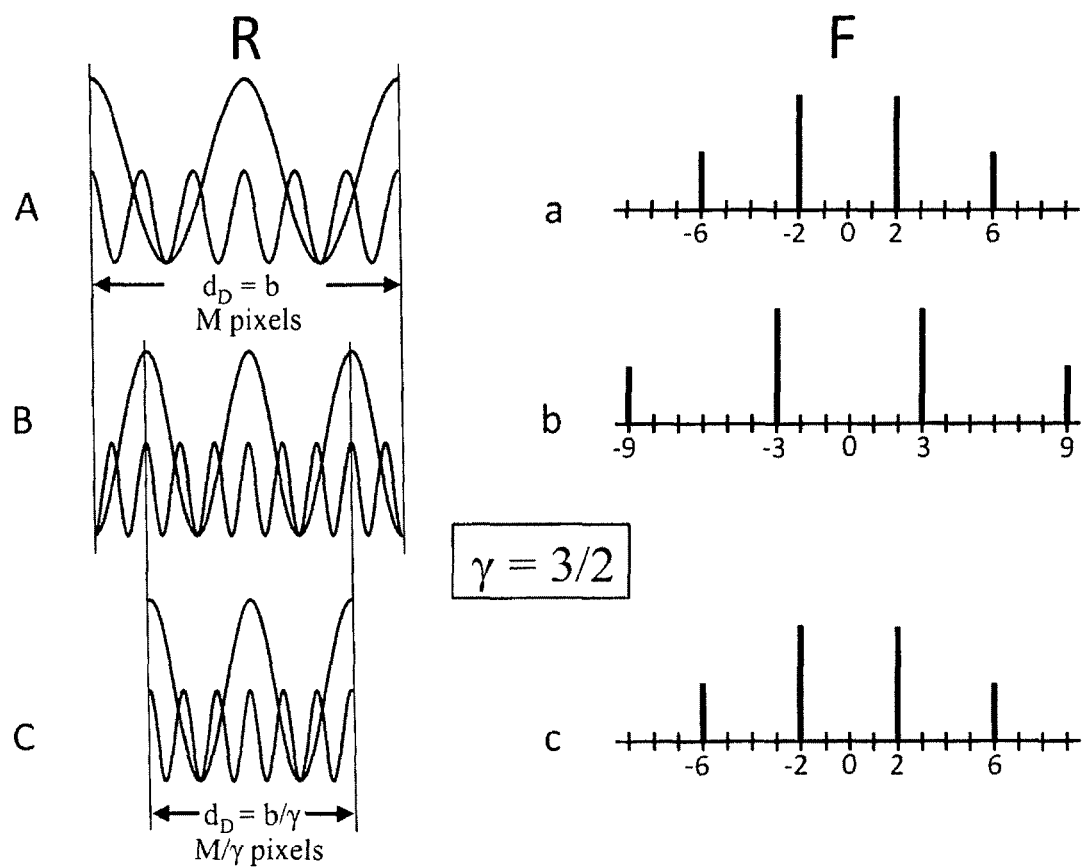
FIG. 3: shows a selection of the section from the second representation, and therefore both representations relate to the same region of the object.

FIG. 3 illustrates, in detail, the principle of fitting object spectra from differently magnified pictures of the same object by means of a discrete Fourier transformation is for a discrete object spectrum comprising only two cosine waves having different frequencies. The representation of one transfer function was omitted here, for clarity. The left column in FIG. 3 contains representations in the real space R, the right column in FIG. 3 contains representations in the Fourier space F. The numbers utilized on the right side in FIG. 3 to indicate the frequency axis refer to the number of periods per image section.

A cosine wave, which comprises n periods, for example, within one image section of $d_D=b$ in the real space, can be reduced to two plane waves having the form Exp $[2\pi in/bx]$ and Exp $[-2\pi in/bx]$. Subfigure A of FIG. 3 shows such a superposition of two cosine waves in the real space, which occupies M pixels on the detector. After the Fourier transformation (subfigure a of FIG. 3), Fourier coefficients result for each cosine wave at the discrete frequencies n/b and −n/b, wherein these Fourier coefficients are each represented via the number n of periods contained in the image. For two cosine waves, the Fourier spectrum therefore comprises four non-zero Fourier coefficients.

Subfigure B of FIG. 3 shows the same superposition of the two cosine waves, which also contains a section $d_D=b$, which is M pixels wide on the detector. In this case, however, the superposition was taken at a different magnification, with $\gamma=3/2$. In the Fourier transformation (subfigure b of FIG. 3), the Fourier coefficients are shifted accordingly to other frequencies as compared to subfigure a.

If the section $d_D=b/\gamma$, which corresponds to M/γ pixels on the detector and is shown in subfigure C, is now selected from subfigure B of FIG. 3, this section contains the same number of periods for both cosine waves as the section shown in subfigure A. Due to this identical region selection, exactly identical scenarios are present, regardless of the sampling rate that is selected. Therefore, the Fourier spectrum shown in subfigure c contains contributions for the same frequencies as the Fourier spectrum that is shown in subfigure a and was generated from subfigure A. The potential to produce a mutual fit of the object frequencies accompanied by a mutual identity of the Fourier coefficients is based on the fact that, given a sufficiently large number of support points M, N, the result of a Fourier transformation is independent of the number of support points and, therefore, independent of the sampling rate that is selected. As a result, the object frequencies of the two images and the Fourier coefficients of the object spectrum belonging to the respective object frequencies can be fitted.

The fit of the object spectra of two differently magnified pictures by means of the Fourier transformation in different dimensions M and N, which is described here, could also be achieved in another manner, as an alternative: in FIG. 2, if the subregion I2 of the expansion $d_o=a$ selected from I2' and the pixel count N×N are brought to the pixel count M×M of I1 by means of an interpolation method in the real space, it is then possible to perform a discrete Fourier transformation of the dimension M×M in I2 in order to produce the fit of the object frequencies between I1 and I2. However, this method requires that each interpolation, in turn, have a transfer function, which would need to be additionally characterized, since I2 is then accompanied by this transfer function, while I1 is free from this additional transfer function. Increasing the polynomial order of the interpolation reduces the error of the interpolation, which would therefore be minimalized at the highest-possible order N. However, the previously demonstrated approach by means of the direct Fourier transformation of the dimension N×N corresponds exactly to this alternative real-space interpolation of the order N. Due to the clearly greater computational efficiency and the absolutely symmetrical handling of the two images, which makes it unnecessary to interpolate an image while leaving the other image untreated, the previously described approach of the direct Fourier transformation with different dimensions M and N is clearly preferable.

Independent of the type of image processing is the fact that, once a fit of the object frequencies has been achieved, the respectively greatest depictable object frequency of the images I1 and I2 is different. In the representation selected here, in which—without loss of generality—I2 has a lower magnification, the greatest usable object frequency (Nyquist frequency) for I2 is also lower than for I1. The reason for this is that correspondingly fewer fine object details are discernible at the lower sampling rate of the object, as is the case for I2 having lower magnification. As shown clearly in FIG. 2, the relationship between the Nyquist frequency $g^N_2$ of the frequency-fitted second image and the Nyquist frequency $g^N_1$ of the first image is: $g^N_2=1/\gamma\ g^N_1$.

If a two-dimensional image is depicted in polar coordinates, the previously described fit of the object frequencies relates only to the radial coordinate g, while the azimuthal coordinate φ thereof remains untouched. Furthermore, the evidence that there is an unambiguous solution to the transfer function T(g), which is set forth in the description of the main claim, requires that there are no dependencies between different azimuth angles, nor are any produced. Therefore, any azimuthal direction φ of a spectrum can be handled separately. Although two-dimensional images are handled here, it is sufficient to handle a single exemplary spatial direction φ. The aforementioned evidence therefore applies individually for any arbitrary spatial direction φ while fully maintaining the two-dimensionality.

Figure 4A:
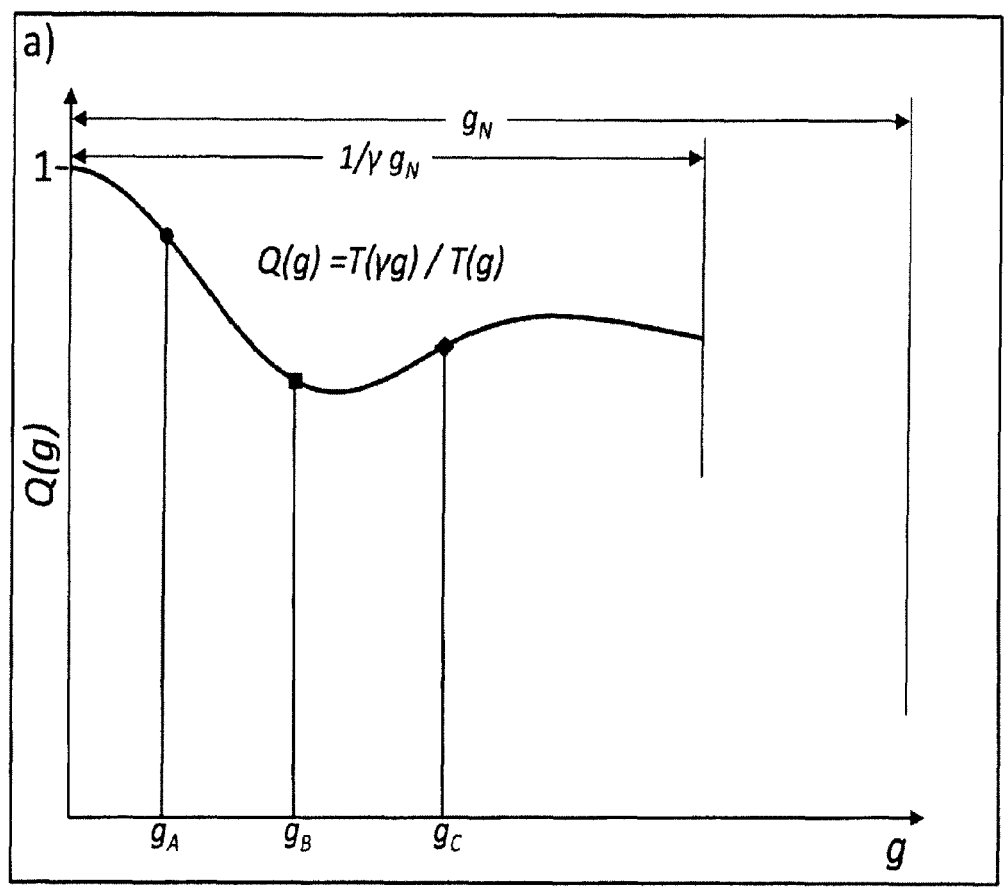
FIG. 4: shows a graphic explanation of the calculation of the difference quotient D(G)
Figure 4B:
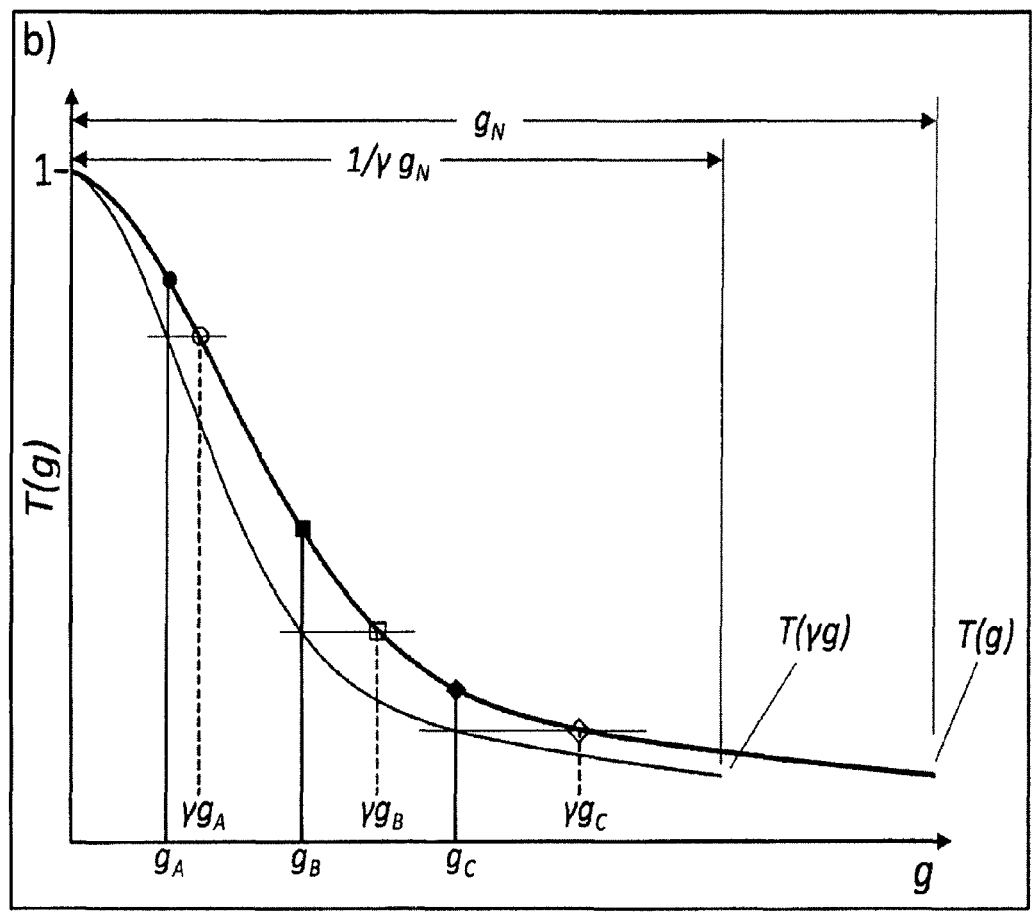

FIG. 4a shows, as an example, a quotient curve Q(g), which can be formed up to the limit frequency $1/\gamma g_N$, wherein $g_N$ is the Nyquist frequency of the first image and γ>1 was required. Three support points $g_A$, $g_B$ and $g_C$ are shown as examples. FIG. 4b shows, as an example, the decomposition of the quotient curve Q(g) that is shown into numerators T(γg) and denominators T(g). FIG. 4b shows how, due to the quotient formation, two points g and γg are always set in pairwise relation on the same curve T(g): Between the points $g_A$ and $\gamma g_A$, the curve of T(g) drops to precisely the value assumed by the curve T(γg) at the point $g_A$.

Figure 4C:
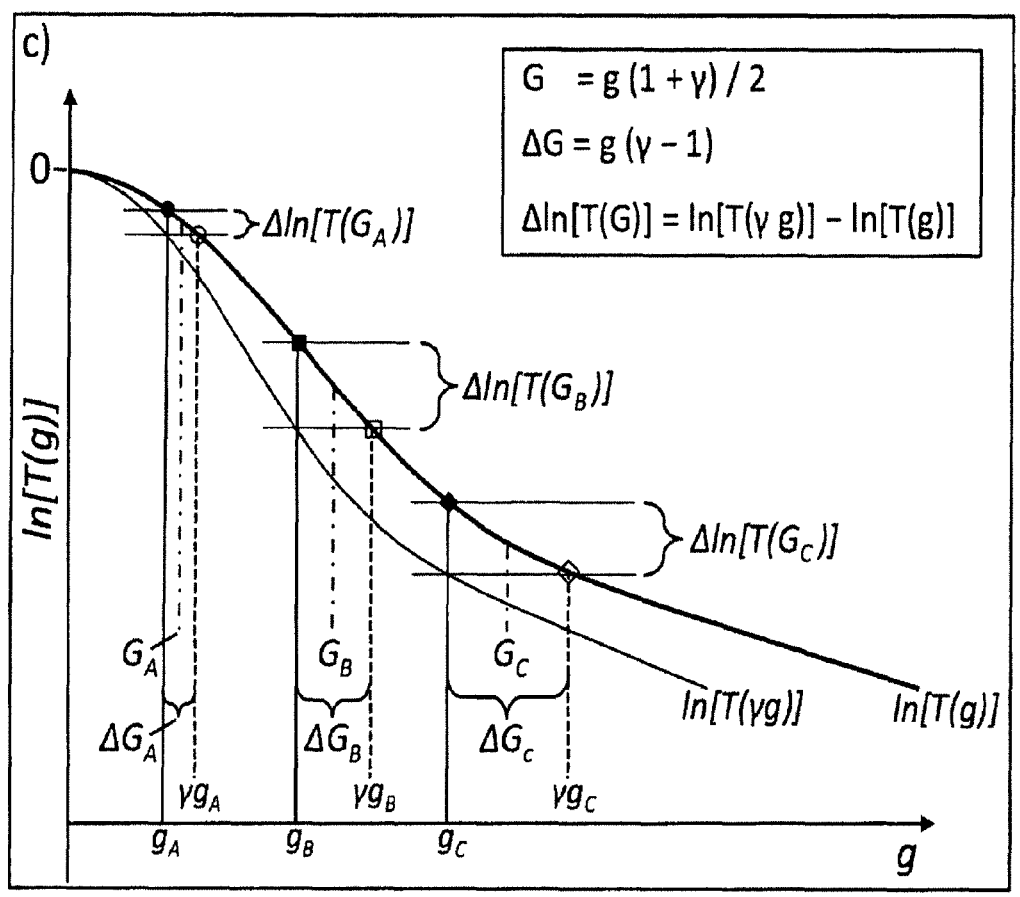
Figure 4D:
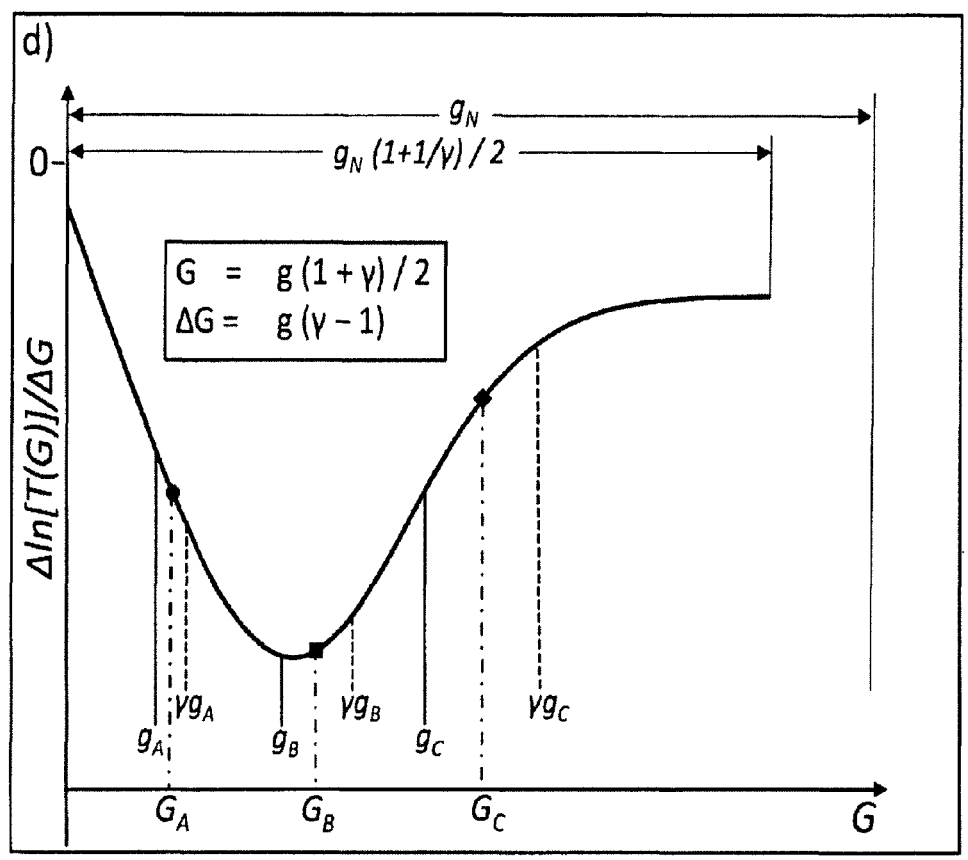

This relation is retained when the two curves are logarithmized (FIG. 4c). The difference between the two curves ln [T(g)] and ln [T(γg)] is now precisely the logarithm of the given quotient curve Q(g). This means that the ordinate section of the difference quotient for ln [T(g)] is known. The difference quotient Δ ln [T(G)]/ΔG is therefore available for all frequencies up to $g_N(1+1/\gamma)/2$ (FIG. 4d). It is therefore possible to unambiguously determine T(G) by integration.

FIG. 5 shows an exemplary embodiment of the method according to the invention for determining the transfer function of the CCD camera of a transmission electron microscope. FIG. 5a shows the electron microscopic picture of a common commercial test sample comprising a thin carbon film lying on a copper mesh. The nominal magnification of this picture, which is labelled Image 1, is 13000. The CCD camera used to take the picture comprises 2048×2048 pixels of a size of 15 micrometers. FIG. 5b shows a section of a second picture (Image 2), which was made of the same object region with a 10000-fold nominal magnification. This section, which is congruent to Image 1, comprises 1556×1556 pixels and is referred to as Image 2. The precise magnification ratio between Images 1 and 2 is γ=1.316. The two-dimensional frequency spectrum of Image 1 was determined by means of the algorithm of the fast Fourier transform (FFT) at 2048×2048 pixels, the corresponding frequency spectrum of Image 2 by means of a mixed-radix FFT at 1556×1556 pixels. The two two-dimensional spectra were then azimuthally averaged according to equation (4) in order to reduce noise. In order to further reduce noise, four such independently obtained spectra comprising four pictures each were averaged for Image 1 and for Image 2. The one-dimensional spectra obtained in this manner were then corrected with respect to a noise constant according to equation (6). This step is necessary since a low additive base amount of the intensity spectra, which is due to noise, can become dominant at high spatial frequencies. Since this base amount is not dependent on the object, nor on the transfer function, it cannot be handled according to equation (2), and would systematically falsify the result at high spatial frequencies. The intensity spectra $I_1(g)$ and $I_2(g)$, which have been reduced by the base amount, are shown in FIG. 5c. The discrete indexing of the frequency axis selected in FIG. 5 corresponds to the representation selected in FIG. 3, wherein the frequency n=1024 is the Nyquist frequency of Image 1, which comprises 2048×2048 pixels.

Figure 5A:
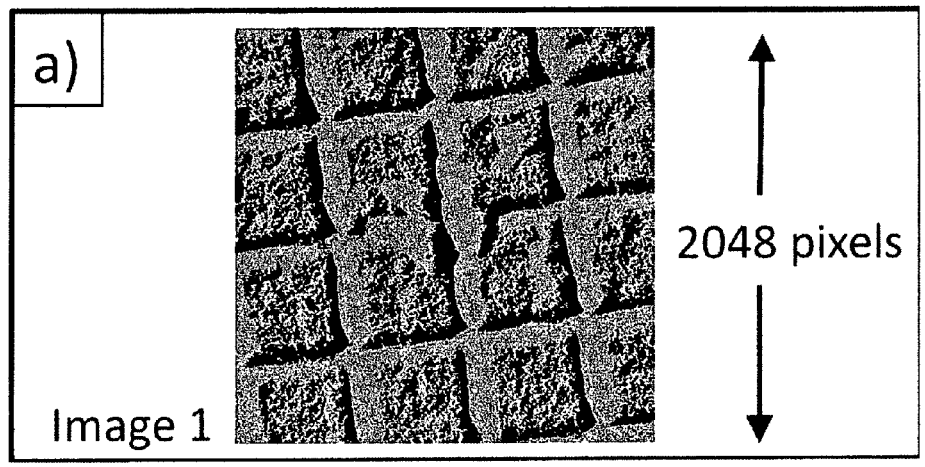
FIG. 5: shows an exemplary embodiment of the method with an electron microscope.
Figure 5B:
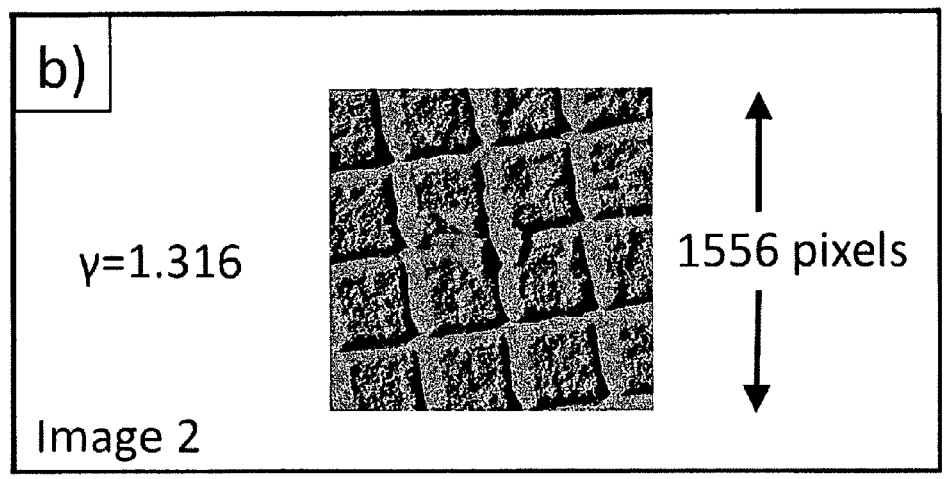
Figure 5C:
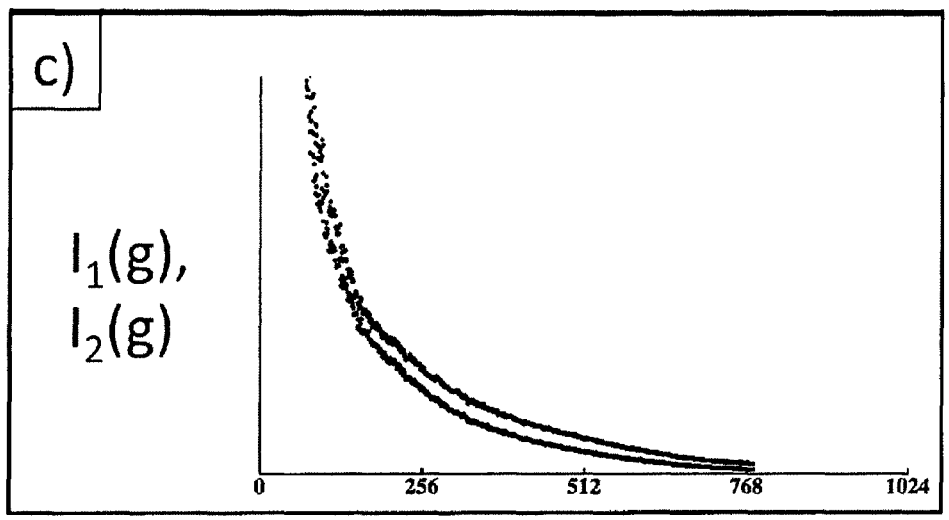
Figure 5D:
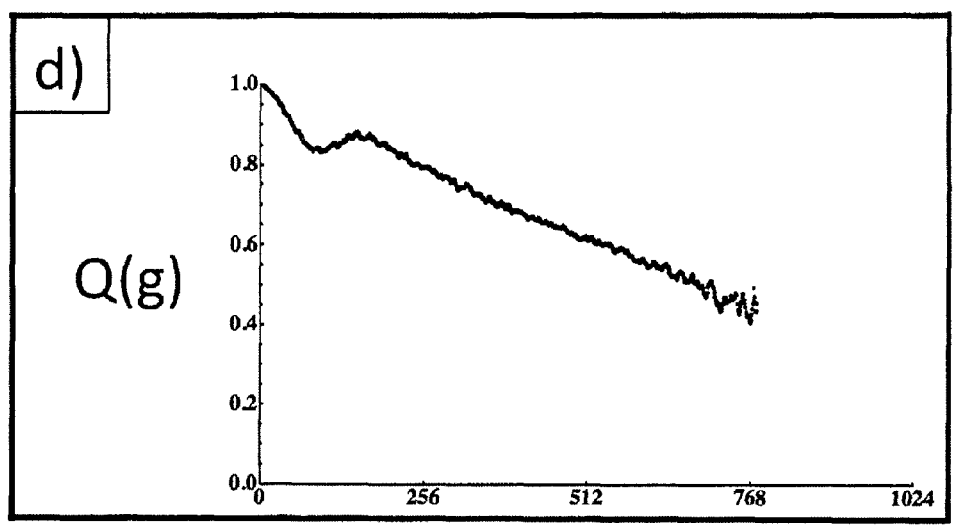
Figure 5E:
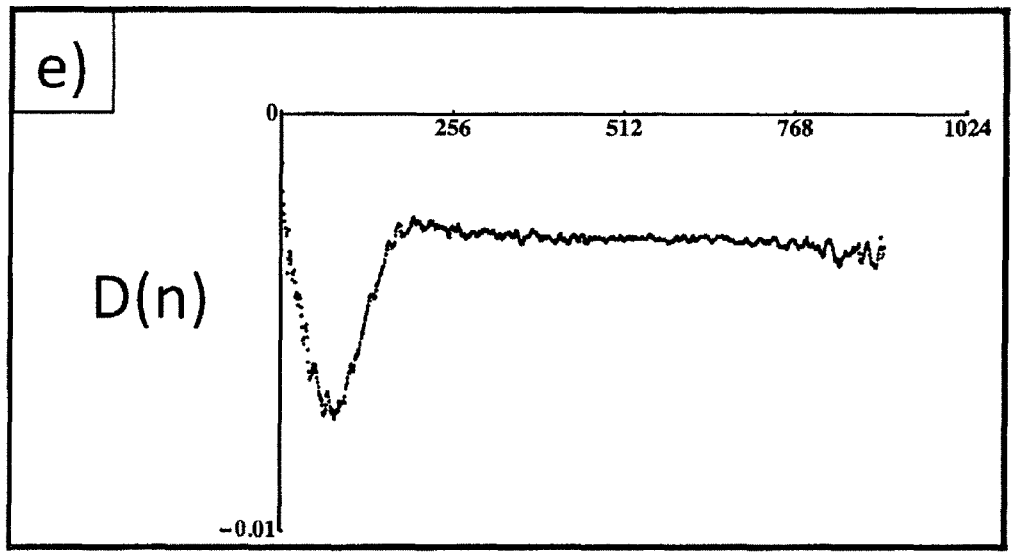
Figure 5F:
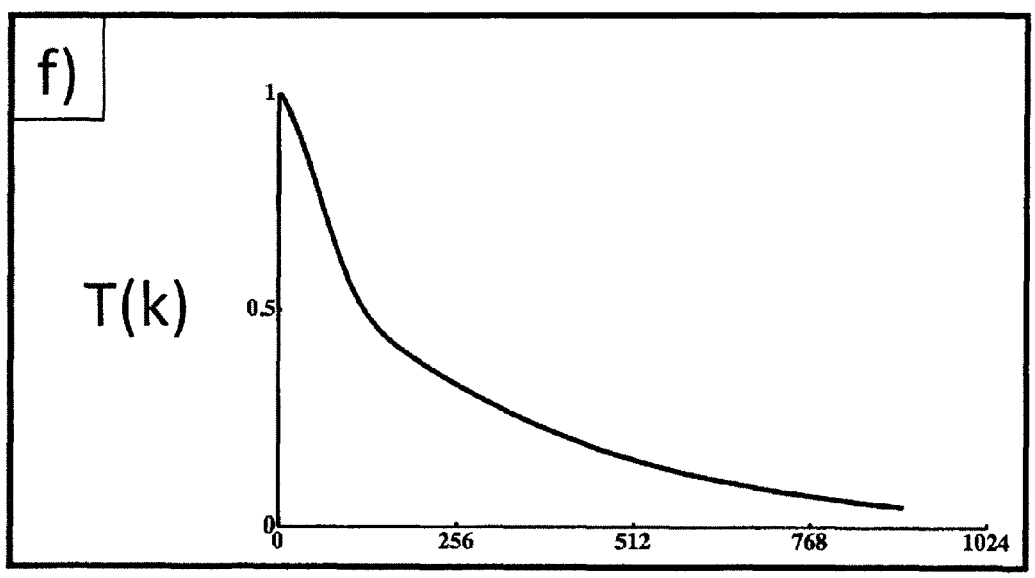

FIG. 5d shows the quotient curve Q(g) formed from the two intensity curves $I_1(g)$ and $I_2(g)$ according to equation (3). The difference quotient D(G) is then formed from the quotient curve Q(g) with the aid of equations (4)-(7). FIG. 5e shows the representation of the difference quotient $D_n=D$(n), which restores the original metrics of Image 1 and was obtained by means of interpolation according to equation (11). In this representation, a difference quotient $D_n=D$(n) having the index n corresponds exactly to a frequency of Image 1 having the index n. The transfer function T(k) of the CCD camera sought, which results via summation according to equation (12) and subsequent exponentiation according to equation (13), is shown in FIG. 5f. The obviously smooth curve shape of the transfer function T(k) obtained does not result—as one may believe—from an additional smoothing step at this point, but rather is an intrinsic smoothing effect according to equation (12), and according to the more general integration similar thereto, according to equation (9).

The invention claimed is:

1. A method for determining the transfer function T(x) or an equivalent T(g) of a signal-processing system from at least two representations $I_1(x)$ and $I_2(x)$ corresponding to respective scale factors of an object, the first representation $I_1(x)$ being produced from a first input signal originating from the object and having a first scale factor, the second representation $I_2(x)$ being produced from a second input signal, the second input signal either originating from the object and having a second scale factor different than the first scale factor or the second input signal originating from a geometrically-identical object of a different scale factor than said object, said first input signal and second input signal being generated by the corresponding object changing a physically-measured quantity in a spatially-dependent or a time-dependent manner, the signal processing system comprising a detector that detects said first input signal and said second input signal and a signal processor that forms said at least two representations $I_1(x)$ and $I_2(x)$, the method comprising:

selecting a first section of the representation $I_1(x)$ from the object and selecting a second section of the representation $I_2(x)$ based on a same area of said object as said first section or an equivalent area of said geometrically-identical object corresponding to said first section, wherein said first section and second section are selected using a similarity measure that is optimized having free parameters corresponding to a position and extent of the second section, said similarity measure being optimized so that said first section and said second section correspond to a same unknown input signal;

transforming with the signal processor the two representations into a working space, in which each is depicted as the product of the transfer function and said unknown input signal;

selecting by the signal processor sections of the two representations $I_1(x)$ and $I_2(x)$ that relate to corresponding or equivalent regions of the corresponding object, and therefore trace back to a same or equivalent portion of said unknown input signal, and expressing with said signal processor said selected sections in the working space as functions $I_1(g)$ and $I_2(g)$;

deriving a quotient $Q(g)=I_2(g)/I_1(g)$ of said functions, wherein said unknown input signal is suppressed and numerators and denominators of said quotient each contain the transfer function sought, with differently scaled arguments;

deriving by the signal processor the transfer function T(x) or said equivalent T(g) based on said derived quotient Q(g).

2. The method according to claim 1, wherein the two representations are transformed into a frequency space.

3. The method according to claim 1, wherein the two representations are Fourier-transformed.

4. The method according to claim 1, further comprising defining a logarithm of Q(g) continuously or at discrete support points, and defining a difference quotient continuously or at discrete support points based on the logarithm of Q(g).

5. The method according to claim 4, wherein said deriving the transfer function comprises at least one of integrating and summing the difference quotient.

6. The method according to claim 4, wherein said defining the difference quotient comprises computing said difference quotient for a position g in the working space, in which said two functions $I_1(g)$ and $I_2(g)$ are selected from a plurality of at least three representations, wherein the selected functions differ from one another by a predefined scale factor y.

7. The method according to claim 6, wherein the scale factor y is between 1 and 2.

8. The method according to claim 1, wherein, prior to said transforming, one representation among said representations $I_1(x)$ and $I_2(x)$ having a lesser expansion in real space is interpolated up to an expansion of an other representation of said representations $I_1(x)$ and $I_2(x)$.

9. The method according to claim 1, wherein transforming the two representations into said working space comprises transforming the functions I1(g) and I2(g) of the selected sections of the two representations into polar coordinates and azimuthally averaging said functions in said polar coordinates.

10. The method according to claim 9, wherein a noise spectrum or a constant noise background is corrected out of the azimuthally averaged functions.

11. The method of claim 1, further comprising, prior to said transforming the representations, producing by said signal processor said at least two representations $I_1(x)$ and $I_2(x)$ corresponding to respective scale factors of said object.

12. The method according to claim 11, wherein a different scaling of the representations $I_1(x)$ and $I_2(x)$ is set by changing the scaling of the input signal, O(x), generated by the object at an input of the system.

13. The method according to claim 11, wherein the different scaling of the representations $I_1(x)$ and $I_2(x)$ is set by changing a spatial separation between the object and the signal-processing system.

14. The method according to claim 11, wherein at least one of the representations $I_1(x)$ and $I_2(x)$ is produced as an aggregation of at least two individual representations.

15. The method according to claim 1, wherein noise is selected as the object.

16. The method according to claim 1, wherein said detector is a telescope's detector, and further comprising detecting said object with the telescope's detector.

17. The method according to claim 1, wherein said detector is a electron microscope's detector, and further comprising detecting said object with the electron microscope's detector.

18. The method according to claim 1, wherein said detector is a camera's detector, and further comprising detecting said object with the camera's detector.

19. The method according to claim 1, further comprising defining a logarithm of Q(g) continuously or at discrete support points, and defining a difference quotient continuously or at discrete support points based on based on an arithmetic frequency center point that the logarithm of Q(g) is assigned to.

20. The method according to claim 1, wherein said similarity measure is a cross correlation function, and wherein said selecting sections of the two representations $I_1(x)$ and $I_2(x)$ comprises optimizing free parameters of the cross correlation function, said free parameters being a position and expansion of the section for the representation $I_2(x)$.

21. A method for determining the transfer function T(x) or an equivalent T(g) of a signal-processing system from at least two representations I1(x) and I2(x) corresponding to respective scale factors of an object, the first representation I1(x) being produced from a first input signal originating from the object and having a first scale factor, the second representation I2(x) being produced from a second input signal, the second input signal either originating from the object and having a second scale factor different than the first scale factor or the second input signal originating from a geometrically-identical object of a different scale factor than said object, said first input signal and second input signal being generated by the corresponding object changing a physically-measured quantity in a spatially-dependent or a time-dependent manner, the signal processing system comprising a detector that detects said first input signal and said second input signal and a signal processor that forms said at least two representations I1(x) and I2(x), the method comprising:

selecting a first section of the representation I1(x) from the object and selecting a second section of the representation I2(x) based on a same area of said object as said first section or an equivalent area of said geometrically-identical object corresponding to said first section, wherein said first section and second section are selected using a similarity measure that is optimized having free parameters corresponding to a position and extent of the second section, said similarity measure being optimized so that said first section and said second section correspond to a same unknown input signal;

transforming with the signal processor the two representations into a working space, in which each is depicted as the product of the transfer function and said unknown input signal;

selecting by the signal processor sections of the two representations I1(x) and I2(x) that relate to corresponding or equivalent regions of the corresponding object, and therefore trace back to a same or equivalent portion of said unknown input signal, and expressing with said signal processor said selected sections in the working space as functions I1(g) and I2(g);

deriving a quotient Q(g)=I2(g)/I1(g) of said functions, wherein said unknown input signal is suppressed and numerators and denominators of said quotient each contain the transfer function sought, with differently scaled arguments;

deriving by the signal processor the transfer function T(x) or said equivalent T(g) based on said derived quotient Q(g); and wherein said equivalent T(g) is derived using a parameterized approach optimized with an optimization procedure such that the quotient Q(g) is best reproduced from T(g).

22. The method according to claim 21, wherein T(g) is optimized to the best possible agreement of a quotient T(pg)/T(g) with the quotient $Q(g)=I_2(g)/I_1(g)$ obtained from $I_1(g)$ and $I_2(g)$, wherein p is a scale factor.

23. The method according to claim 22, wherein a scale factor y that was previously known or was set in the preparation of the representations $I_1(x)$ and $I_2(x)$, wherein these representations differ by this scale factor y, is selected as the scale factor p.

24. The method according to claim 22, wherein the scale factor p is determined as part of said optimization procedure.

25. The method according to claim 21, wherein said similarity measure is a cross correlation function, and wherein said selecting sections of the two representations $I_1(x)$ and $I_2(x)$ comprises optimizing free parameters of the cross correlation function, said free parameters being a position and expansion of the section for the representation $I_2(x)$.

26. A method for determining the transfer function $T(x)$ or an equivalent $T(g)$ of a signal-processing system from at least two representations $I_1(x)$ and $I_2(x)$ corresponding to respective scale factors of an object, the first representation $I_1(x)$ being produced from a first input signal originating from the object and having a first scale factor, the second representation $I_2(x)$ being produced from a second input signal, the second input signal either originating from the object and having a second scale factor different than the first scale factor or the second input signal originating from a geometrically-identical object of a different scale factor than said object, said first input signal and second input signal being generated by the corresponding object changing a physically-measured quantity in a spatially-dependent or a time-dependent manner, the signal processing system comprising a detector that detects said first input signal and said second input signal and a signal processor that forms said at least two representations $I_1(x)$ and $I_2(x)$, the method comprising:

selecting a first section of the representation $I_1(x)$ from the object and selecting a second section of the representation $I_2(x)$ based on a same area of said object as said first section or an equivalent area of said geometrically-identical object corresponding to said first section, wherein said first section and second section are selected using a similarity measure that is optimized having free parameters corresponding to a position and extent of the second section, said similarity measure being optimized so that said first section and said second section correspond to a same unknown input signal;

transforming with the signal processor the two representations into a working space, expressed respectively, as functions $I_1(g)$ and $I_2(g)$ and in which each function is depicted as the product of the transfer function and the unknown input signal;

deriving a quotient $Q(g)=I_2(g)/I_1(g)$ of said functions, wherein said unknown input signal is suppressed and numerators and denominators of said quotient each contain the transfer function sought, with differently scaled arguments;

deriving by the signal processor the transfer function $T(x)$ or said equivalent $T(g)$ based on said derived quotient $Q(g)$; and wherein said step of deriving the transfer function $T(x)$ or said equivalent $T(g)$, comprises:

calculating by the signal processor a logarithm of the quotient $Q(g)$;

using the logarithm of the quotient $Q(g)$ for computing with the signal processor a difference quotient for a logarithm of the transfer function that approximates a derivative of the transfer function; and deriving by the signal processor the transfer function $T(g)$ from said approximated derivative of the transfer function.

* * * * *